United States Patent [19]

Whitfield et al.

[11] 4,175,248
[45] Nov. 20, 1979

[54] ELECTRIC POWER ACTUATOR

[75] Inventors: Dwight B. Whitfield, Bloomfield, Mich.; Kenneth K. Ferryman, Jr., Onalaska, Wis.

[73] Assignee: Lake Center Industries, Winona, Minn.

[21] Appl. No.: 816,372

[22] Filed: Jul. 18, 1977

[51] Int. Cl.² .................................................. H02P 3/00
[52] U.S. Cl. .................................................. 318/467
[58] Field of Search ................. 318/467, 282, 15, 466, 318/468; 200/16 R, 16 D; 310/68 A, 68 B

[56] References Cited

U.S. PATENT DOCUMENTS

| 1,849,643 | 3/1932 | Seasongood et al. | 200/16 R |
| 2,688,718 | 9/1954 | Hoffar | 200/16 R X |
| 2,756,377 | 7/1956 | Litzman | 318/466 X |

Primary Examiner—David Smith, Jr.
Attorney, Agent, or Firm—Kinzer, Plyer, Dorn & McEachran

[57] ABSTRACT

An electrically driven linear actuator has a housing with a plurality of bus bars mounted within the housing. An electric motor is positioned in the housing and is in driving relationship with a linearly movable actuator member. The actuator member carries a contact which moves along and in contact with the bus bars. There is an electrical connection between the bus bars and the motor with the flow of current through this connection being controlled by the movable contact.

1 Claim, 4 Drawing Figures

ELECTRIC POWER ACTUATOR

SUMMARY OF THE INVENTION

The present invention relates to electrically driven linear actuators and in particular to such a device which may be used to open and close the doors of an automotive climate control system.

One purpose of the invention is an actuator of the type described in which there are bus bar means within a motor housing and a movable contact on an actuator driven by the motor, with the relative position of the contact on the bus bar means controlling operation of the motor.

Another purpose is a simply constructed reliably operable linear actuator of the type described.

Another purpose is an actuator movable between positively controlled positions.

Another purpose is an actuator having no current drawn after it has reached a designated position.

Another purpose is an actuator which seeks a shut-off condition.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figure 1:
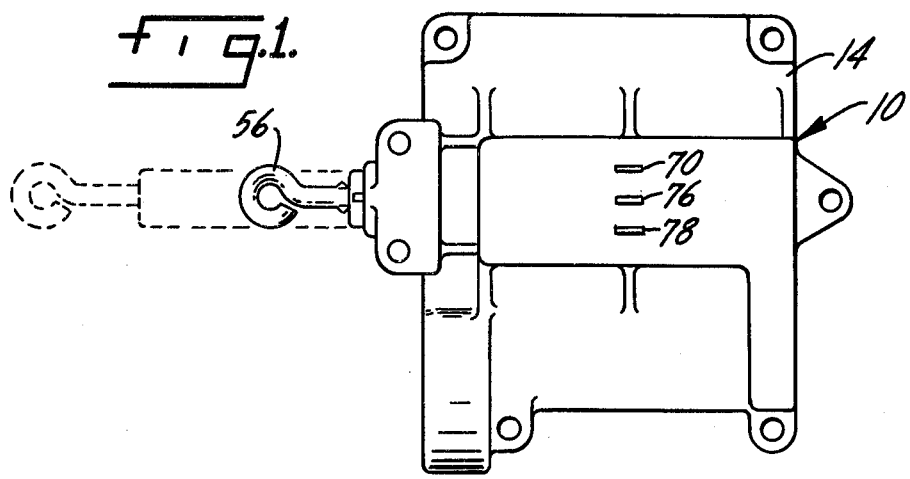
FIG. 1 is a side view of an actuator of the type described.
Figure 2:
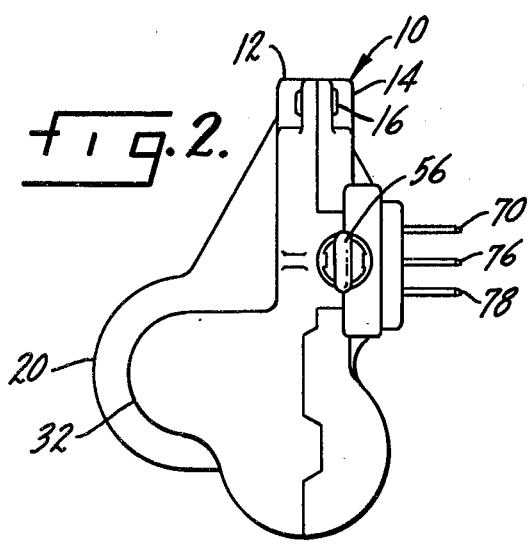
FIG. 2 is an end view of the actuator of FIG. 1.
Figure 4:
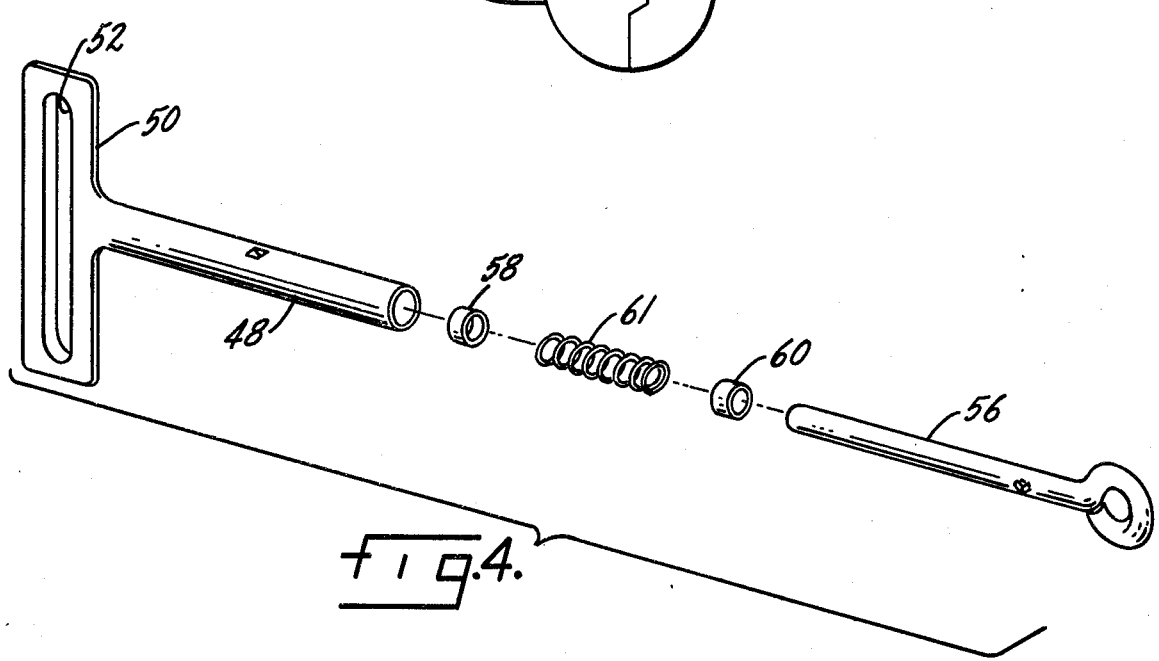
FIG. 4 is an exploded perspective of the actuator member.
Figure 3:
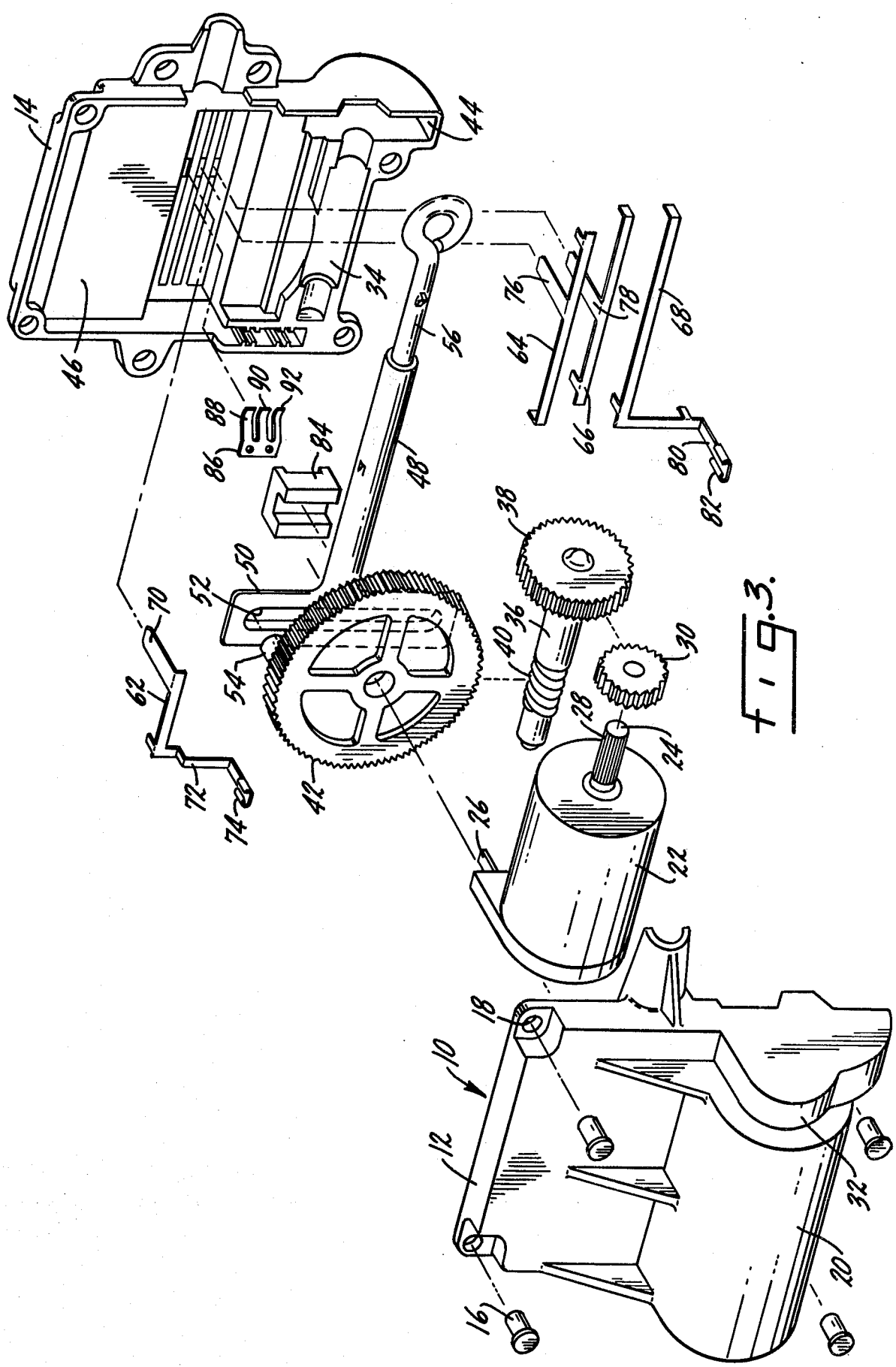
FIG. 3 is an exploded perspective of the actuator.

The linear actuator of the present invention has wide application. It has found particular utility as a means for opening and closing and variably positioning doors in an automotive climate control system in which the temperature of the air supplied to the passenger compartment is controlled for passenger comfort. The actuator is reliably operable and can quickly cause the desired degree of door movement in the application described.

A housing is indicated generally at 10 and may be formed be two housing sections 12 and 14 held together by rivets or the like 16. The rivets may pass through aligned openings 18 in the housing sections 12 and 14 when the housing is assembled upon the elements to be described.

Positioned within an annular cavity 20 in housing section 12 is a small D.C. motor 22 having a generally cylindrical exterior and a drive shaft 24 extending outwardly from one end. The opposite end of the housing of motor 22 has a pair of electric terminals 26 extending outwardly therefrom, the purpose of which will be described in detail hereinafter. Motor shaft 24 has a knurled surface 28 for use in mounting a worm gear 30. Gear 30 is fast on shaft 24 and rotates with it when the motor moves in either direction. Gear 30, when positioned on shaft 24 fits within a recess 32 in housing section 12. Positioned within an elongated cavity 34 substantially within housing section 14 is a worm and gear 36 having a gear portion 38 in mesh with worm gear 30 and a worm portion 40 in mesh with a spur gear 42. Gear portion 38 is positioned within opposing cavities 44 formed in each of the housing sections 12 and 14. Spur gear 42 is similarly positioned within cavities 46 in each of the housing sections 12 and 14.

A linearly movable actuating member 48 is positioned within the housing and moves generally along a path coaxial with its axis. Actuator member 48 has a flattened portion 50 extending generally perpendicular to the axis of movement and including an alongated slot 52. A projection 54 extends outwardly from spur gear 42 and is positioned within slot 52. Thus, rotation of spur gear 42 is effective to cause linear movement of member 48 along its described path of movement.

Actuator member 48 includes an eyelet bolt 56 extending outwardly of housing 10 and fastened to the interior portion of the actuator member by a pair of spaced bushings 58 and 60 and a coil spring 61. The described mounting permits slight relative movement between the exterior eyelet bolt 56 and the interior portion of the actuator member, although the eyelet bolt will substantially follow movement of the interior portion of the actuator member as it is driven through the described drive system by motor 22.

Positioned upon an interior wall of housing section 14 are a plurality of bus bars indicated at 62, 64, 66 and 68. Bus bar 2 has a terminal portion 70 extending outwardly through an opening in housing section 14 for connection to a source of electrical power. An inwardly extending arm 72 of bus bar 62 has a terminal clip 74 on its end which is connected to one of clips 26 on motor 22, thus providing one of the lead-in connections for the motor. All four of the bus bars are mounted in parallel relation and bus bar 64, positioned adjacent to bus bar 62, similarly has a terminal 76 extending outwardly through an opening in housing section 14. Bus bar 66 has a terminal 78 extending outwardly through an opening in housing section 14 and is mounted directly adjacent bus bar 64. Bus bar 68 does not have a terminal, but does have an arm 80 mounting a terminal clip 82 at one end which is connected to the other of the two terminals 26 on motor 22, thus providing the other lead-in for motor operation.

Mounted upon actuator 48 is a carrier 84 which is fastened to the actuator and moves linearly with it. Mounted on carrier 84 is a cross slide 86 having three contact arms designated at 88, 90 and 92. Arms 88, 90 and 92 bear against and are in electrical contact with bus bars 64, 66 and 68, respectively.

In operation, bus bar 62 will provide the ground connection for the motor and is connected directly to one of the input connections 26 of the motor. Depending upon whether bus bar 64 or bus bar 66, through their respective terminals 76 and 78, receive current and thus pass such current to bus bar 68 through cross slide 86, the motor will run in either a counterclockwise or clockwise direction. The contact arms of the cross slide pass the current from one of the two bus bars having terminals to the common bus bar 68. The period of motor rotation is determined by the length of the bus bars.

Bus bar 64 extends further in one direction than bus bar 66, whereas, bus bar 66 extends further in the other direction than bus bar 64. Bus bar 68 extends the entire combined lengths of bus bars 64 and 66. Thus, if current is supplied to bus bar 64, arm 88 will supply this current to bus bar 68 through arm 92 and the motor will move in one direction until arm 88 no longer contacts bus bar 64, causing the motor to stop operation. In the reverse direction, current is supplied through terminal 78 to bus bar 66 and through arms 90 and 92 to bus bar 68. The motor will run in the opposite direction until arm 90 no longer contacts bus bar 66. Thus, the differential positioning of the bus bars provides automatic termination of motor operation after the actuator, as driven by the motor, has moved through a predetermined distance.

Assuming current is supplied to the motor in the manner described above, rotation of worm gear 30 will drive spur gear 42 through the worm and gear combination 36. As spur gear 42 rotates, projection 54 moving in slot 52 will cause actuator member 48 to reciprocate or move in a linear path. Since carrier 84 is mounted on actuator member 48, it will move with it and as the cross slide is mounted upon the carrier, the described motor automatic cutoff will take place after predetermined movement of actuator member 48.

Although operation has been described and the invention has been disclosed in connection with a bus bar and contact arm arrangement providing for substantially equal movement in opposite directions, with additional bus bars there can be provision for periodic or segmented movement in one or both directions.

Of particular advantage is the interrelationship between the bus bar and the contact arms carried by the actuator member, whereby the motor automatically terminates its operation after movement through a predetermined distance. The simplified construction provides such movement with only three bus bars. The fourth bus bar, in some applications, could be a direct electrical connection and need not be a bus bar at all.

Once the actuator member has moved to a desired position, current to the motor stops. There is thus no current drawn once actuator movement has ceased. The inherent braking effect of the motor and drive connection functions as a brake to positively hold the actuator in position.

Whereas the preferred form of the invention has been shown and described herein, it should be realized that there may be many modifications, substitutions and alterations thereto.

The embodiments of the invention in which an exclusive property or privilege is claimed are defined as follows:

1. A linear actuator including a housing made up of two opposed housing halves, an electric motor mounted in one of the housing halves, a gear train positioned between the two housing halves and driven by the motor, a movable actuator member extending from the housing and driven by the gear train, electric bus bars mounted in the housing opposite the actuator member, a contact member driven by the actuator member and in electrical and mechanical contact with the bus bars, and an electrical connection between the bus bars and the electric motor so that the position of the contact member on the bus bars controls the flow of current to the motor.

* * * * *